(12) United States Patent
Timmins et al.

(10) Patent No.: US 6,978,333 B2
(45) Date of Patent: Dec. 20, 2005

(54) METHOD AND SYSTEM FOR REDUCING AGGREGATE IMPEDANCE DISCONTINUITY BETWEEN EXPANSION CONNECTORS

(75) Inventors: Ian Timmins, St. John's (CA); Michael Leins, Austin, TX (US); Stuart Hayes, Round Rock, TX (US); Robert Bassman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/048,326

(22) Filed: Feb. 1, 2005

(65) Prior Publication Data

US 2005/0130501 A1   Jun. 16, 2005

Related U.S. Application Data

(63) Continuation of application No. 10/614,578, filed on Jul. 3, 2003, now Pat. No. 6,868,467.

(51) Int. Cl.[7] .......................... G06F 13/00; H03K 17/16
(52) U.S. Cl. .................... 710/301; 326/30; 361/736; 439/637
(58) Field of Search .................. 326/30; 710/301; 333/32, 124; 361/736, 748; 439/637

(56) References Cited

U.S. PATENT DOCUMENTS

| | | | |
|---|---|---|---|
| 5,406,453 A | 4/1995 | Cusato et al. |
| 5,513,329 A | 4/1996 | Pecone |
| 5,544,006 A | 8/1996 | Radloff et al. |
| 5,594,621 A | 1/1997 | van Rumpt |
| 5,604,871 A | 2/1997 | Pecone |
| 5,655,106 A | 8/1997 | Smith |
| 5,708,563 A | 1/1998 | Cranston, III et al. |
| 5,734,840 A | 3/1998 | Chew et al. |
| 5,765,008 A | 6/1998 | Desai et al. |
| 5,790,814 A | 8/1998 | Gan et al. |
| 5,823,818 A | 10/1998 | Bell et al. |
| 5,831,821 A | 11/1998 | Scholder et al. |
| 5,878,238 A | 3/1999 | Gan et al. |
| 5,926,378 A | 7/1999 | DeWitt et al. |
| 5,991,158 A | 11/1999 | Chan et al. |
| 6,118,668 A | 9/2000 | Scholder et al. |
| 6,288,898 B1 | 9/2001 | Johnson et al. |
| 6,292,361 B1 | 9/2001 | Johnson et al. |
| 6,297,957 B1 | 10/2001 | Johnson et al. |
| 6,363,450 B1 | 3/2002 | Lash et al. |
| 6,782,438 B1 | 8/2004 | Duncan et al. |

OTHER PUBLICATIONS

*ATX Riser Card Specification*, Version 1.0 Dec. 1999, Intel Corporation.
*High-Performance Buses and Interconnects*, http://www.extremetech.com.
Brenman, Leor, *SmartLink—Using Riser Cards Can Shrink PC Connectivity Costs*.
TMC Product Riser Card, http://www.tmc-uk.com.

*Primary Examiner*—Daniel Chang
(74) *Attorney, Agent, or Firm*—Haynes and Boone, LLP

(57) ABSTRACT

A method and system are provided for reducing impedance discontinuities which occur when two expansion connectors are located very close to one another on a bus in an information handling system. An interconnect is situated between the two expansion connectors and exhibits an impedance which is selected to be sufficiently low to compensate for the amount by which the impedance of the expansion bus connectors exceeds the impedance of the expansion bus connected thereto.

22 Claims, 6 Drawing Sheets

100

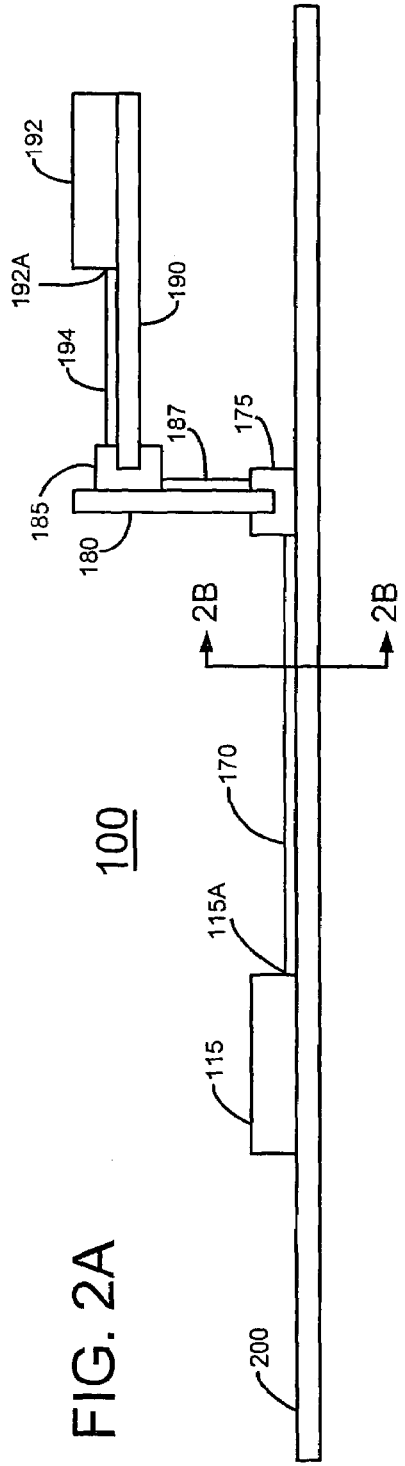
FIG. 2A
FIG. 2B
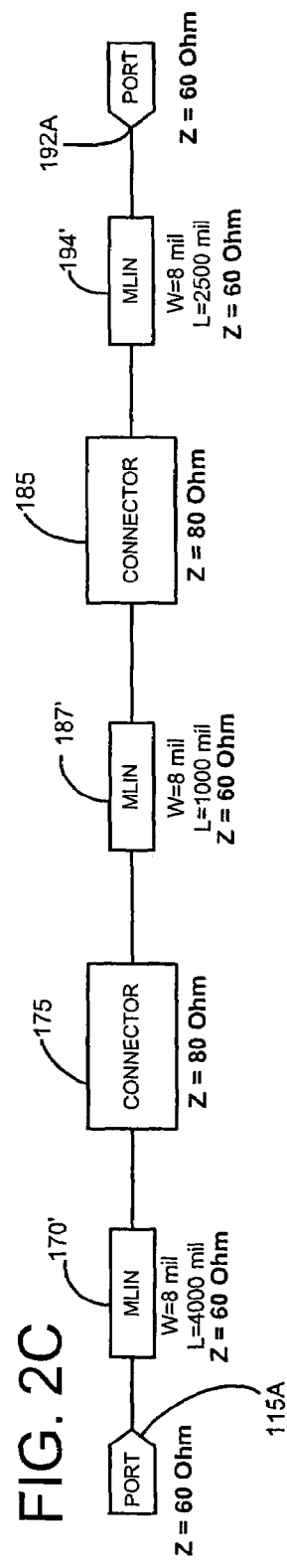
FIG. 2C

METHOD AND SYSTEM FOR REDUCING AGGREGATE IMPEDANCE DISCONTINUITY BETWEEN EXPANSION CONNECTORS

CROSS-REFERENCE TO RELATED APPLICATIONS

This application claims priority to and is a continuation of co-owned, U.S. patent application Ser. No. 10/614,578, filed Jul. 3 2003 is now a U.S. Pat. No. 6,868,467, by Timmins, Ian, et al., entitled INFORMATION HANDLING SYSTEM INCLUDING A BUS IN WHICH IMPEDANCE DISCONTINUITIES ASSOCIATED WITH MULTIPLE EXPANSION CONNECTORS ARE REDUCED, which is incorporated herein by reference in its entirety.

BACKGROUND

The disclosures herein relate generally to information handling systems (IHS's) and more particularly to reducing undesired impedance discontinuities associated with closely spaced expansion connectors on the bus of such a system.

As the value and use of information continue to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many IHS's include a main board or motherboard in which several expansion connectors are situated on a common bus, for example a Peripheral Component Interconnect (PCI) bus. Each expansion connector is capable of receiving an expansion card to provide additional capability to the system. The expansion cards are generally mounted perpendicular to the motherboard.

However, as the physical size of many IHS's continues to decrease, it has become increasingly difficult to install expansion cards within the system enclosure. One solution to help alleviate this problem is the so-called "riser card". A riser card is a card which plugs into a bus connector much like any other expansion card would, namely perpendicular to the motherboard. However, the riser card itself includes one or more bus connectors into which respective expansion cards can be installed. Those expansion cards that are mounted on the riser card will be perpendicular to the riser card and thus parallel to the motherboard. This results in a more compact arrangement.

It has been found that when two expansion bus connectors, such as one on the motherboard and one on the riser card, are spaced very closely together to fit within a 1 U enclosure (1 unit or approx 1.75 inches), they together create an significant impedance discontinuity. In other words, the combined impedance of the expansion connectors is significantly higher than the impedance of the bus to which the connectors are connected. This tends to degrade signals traveling across the connections thus formed.

Therefore, what is needed is a method and system for reducing the aggregate impedance discontinuity which occurs when two expansion connectors are located very close to one another on a bus.

SUMMARY

Accordingly, in one embodiment, a method of controlling the impedance of a bus in an information handling system (IHS) is disclosed. The method includes providing a first bus coupled to a first connector, the first bus exhibiting a bus impedance, the first connector exhibiting a connector impedance which is greater than the bus impedance. The method also includes providing a riser card situated in the first connector, the riser card including a second connector exhibiting an impedance approximately equal to the connector impedance of the first connector. The method further includes providing, on the riser card, an interconnect between the first and second connectors, the interconnect exhibiting an impedance sufficiently low to compensate the amount by which the connector impedance exceeds the bus impedance.

In another embodiment, an information handling system (IHS) is disclosed which includes a processor and a port coupled to the processor. The IHS also includes a first connector coupled to the port by a first bus therebetween, the first bus exhibiting a bus impedance, the first connector exhibiting a connector impedance greater than the bus impedance. The IHS further includes a riser card situated in the first connector, the riser card including a second connector and an interconnect between the second connector and the first connector, the second connector exhibiting a connector impedance approximately equal to the connector impedance of the first connector. The impedance of the interconnect is selected to be sufficiently low to compensate the amount by which the connector impedance exceeds the bus impedance.

In another embodiment, the IHS further includes an expansion card situated in the second connector of the riser card, the expansion card including a second bus exhibiting a bus impedance approximately equal to the impedance of the first bus. The impedance of the interconnect is selected to be sufficiently low that the aggregate impedance of the first connector, the interconnect and the second connector is approximately the same as the first impedance. The second bus is an extension of the first bus.

A principal advantage of the embodiments disclosed herein is a reduction of impedance discontinuities which occur when two expansion connectors are located very close to one another on a bus.

BRIEF DESCRIPTION OF THE DRAWINGS

FIG. 2A–2C show how the information handling system of FIG. 1 experiences impedance discontinuity problems due to closely positioned connectors along a bus of the system, according to an embodiment.

DETAILED DESCRIPTION

Figure 1:
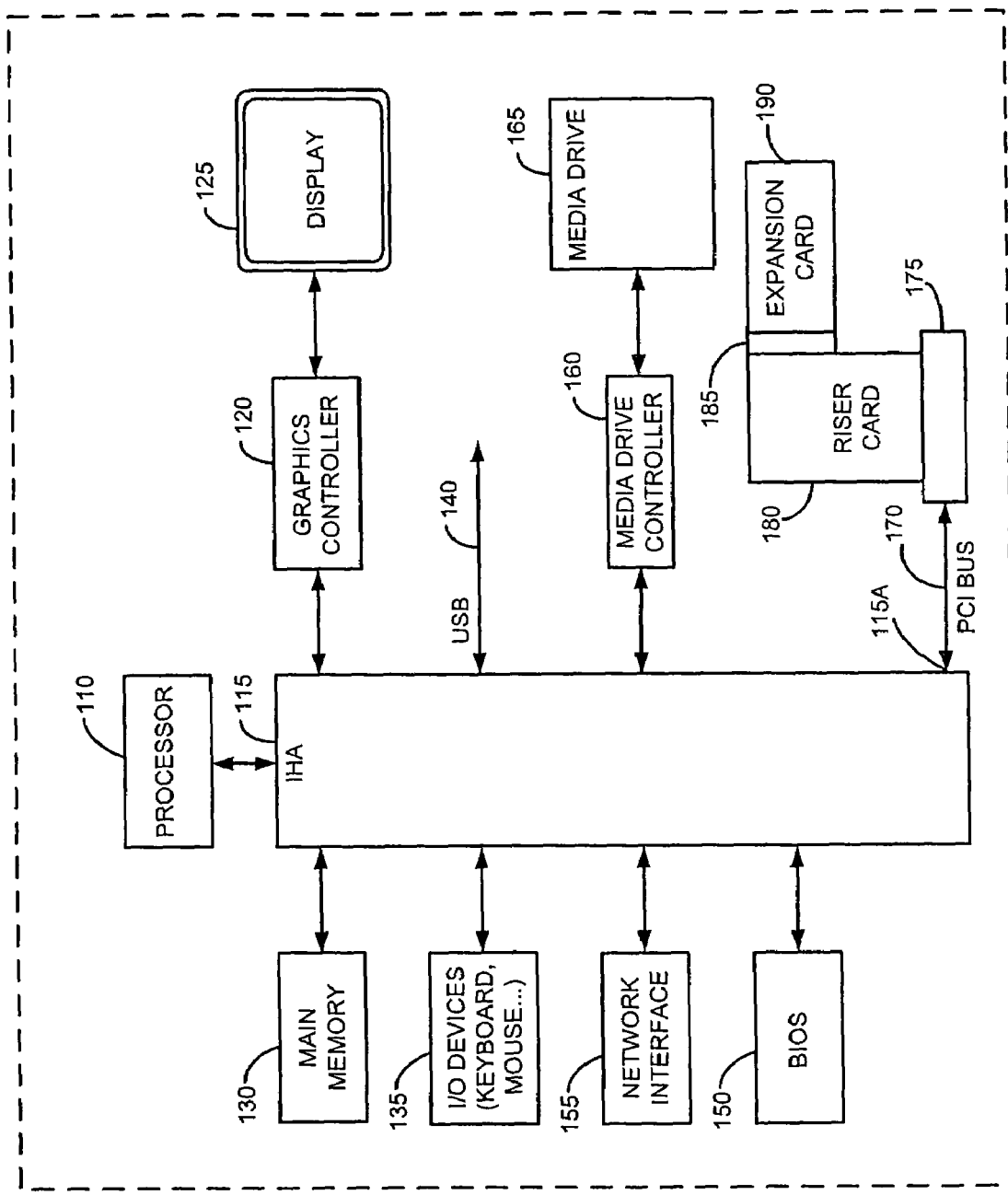
FIG. 1 is a block diagram an information handling system, according to an embodiment.

FIG. 1 is a block diagram of an information handling system 100 which experiences impedance discontinuity problems when two bus connectors are situated in close proximity of one another on a bus.

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Information handling system (IHS) 100 includes a processor 110 such as an Intel Pentium series processor or one of many other processors currently available. An Intel Hub Architecture (IHA) chipset 115 provides IHS system 100 with glue-logic that connects processor 110 to other components of IHS 100. Chipset 115 carries out graphics/memory controller hub functions and I/O functions. More specifically, chipset 115 acts as a host controller which communicates with a graphics controller 120 coupled thereto. Graphics controller 120 is coupled to a display 125. Chipset 115 also acts as a controller for main memory 130 which is coupled thereto. Chipset 115 further acts as an I/O controller hub (ICH) which performs I/O functions. Input devices 135 such as a mouse, keyboard, and tablet, are also coupled to chipset 115 at the option of the user. A universal serial bus (USB) 140 is coupled to chipset 115 to facilitate the connection of peripheral devices to IHS 100. System basic input-output system (BIOS) 150 is coupled to chipset 115 as shown. BIOS 150 is stored in nonvolatile memory such as CMOS or FLASH memory. A network interface controller (NIC) 155 is coupled to chipset 115 to facilitate connection of system 100 to other information handling systems. A media drive controller 160 is coupled to chipset 115 so that devices such as media drive 165 can be connected to chipset 115 and processor 110. Devices that can be coupled to media drive controller 160 include CD-ROM drives, DVD drives, hard disk drives and other fixed or removable media drives.

An expansion bus 170, such as a Peripheral Component Interconnect (PCI) bus, is coupled to chipset 115 as shown. Bus 170 is coupled to an expansion connector 175 which receives a riser card 180 therein as seen in FIG. 1 which is a block diagram not drawn to scale. Riser card 180 includes a connector 185 which receives an expansion card 190. Expansion card 190 provides additional functionality to the IHS. For example, expansion card 190 may be a modem, network interface, audio card, video card, game card or other card providing desired functionality. Bus 170 includes a plurality of signal lines or traces including address, data and control lines in the conventional fashion. Connecting lines or traces extend through connector 175, across riser card 180, through connector 185 and to expansion card 190 as will now be described.

FIG. 2A includes a main circuit board or motherboard 200 (not drawn to scale) on which many of the components of IHS 100 are situated. For example, in one embodiment, processor 110 (not shown), chip set 115, graphics controller 120 (not shown), main memory 130 (not shown) and other structures are mounted on motherboard 200 using standard techniques. When an IHS is fabricated in the manner subsequently described where significant effort is made to minimize the vertical profile of the IHS, for example to a 1U rack height, an impedance discontinuity problem is encountered in the bus structures employed. This problem and its solution will be explained in detail.

A bus, such as a PCI or PCI-X bus 170, is situated on motherboard 200 using microstrip transmission line traces. While the bus is made of several such traces to form the address, data and control lines thereof, a representative microstrip transmission line trace 170' is shown in the perspective cross section view of FIG. 2B. Since bus 170 is a microstrip transmission line structure, a ground plane metallization 171 is situated on the side of board 200 opposite that on which trace 170' is situated. Returning to FIG. 2A, bus 170 extends from port 115A to bus connector 175. In this particular embodiment, bus connector 175 is a PCI or PCI-X bus connector. Other embodiments are contemplated wherein other bus structures and corresponding bus connectors are employed. Connector 175 includes a respective pin for each of the aforementioned address, data and control lines of bus 170.

To decrease the vertical dimension of the IHS as viewed in FIG. 2A, a short riser card 180 is situated in bus connector 175. Riser card 180 is substantially perpendicular to bus 170 and exhibits a height of approximately one inch to fit within a 1U rack height enclosure in one embodiment. A bus connector 185 is situated on riser card 180 as shown. Bus connector 185 is a PCI or PCI-X type bus connector, but again other types of bus connectors are contemplated for use with different buses as desired. Riser card 180 includes an interconnecting bus 187 which couples the address, data and control lines from connector 175 to connector 185. An expansion card 190 is situated in connector 180. A chip or other circuit 192 to provide the IHS with additional functionality is situated on expansion card 190 as shown. Expansion card 190 includes an bus extension 194 which couples the address, data and control lines from connector 185 to chip circuit 192 as needed.

Expansion card 190 is situated in connector 180 in an orientation which is substantially perpendicular to riser card 180 and substantially parallel with motherboard 200. Since expansion card 190 is parallel with motherboard 200 rather than the more typical perpendicular orientation with respect to the motherboard, the vertical height of the IHS depicted in FIG. 2A is smaller than it would otherwise be. However, it has been found that in this approach, impedance discontinuities associated with connectors 175 and 180 are encountered because these connectors are so close to one another.

FIG. 2C shows one of the traces of the above described bus as it passes from port 115A through connector 175, up riser card 180, through connector 185 and to chip 192 so that the connector impedance discontinuity problem can be appreciated. Starting on the left side of FIG. 2C is port 115A which exhibits an impedance (Z) of 60 ohms. A trace 170' of microstrip transmission line (MLIN) connects port 115A to connector 175. Trace 170', which exhibits an impedance (Z) of 60 ohms, is 8 mils wide (W) and 4000 mils long (L). Trace 170' is coupled to a pin of connector 175 which exhibits an impedance (Z) of approximately 80 ohms in this particular example. The impedance of connector 175 does not match that of the 60 ohm microstrip transmission line and thus a first impedance discontinuity is encountered. A trace 187' of microstrip transmission line (MLIN) is situated on riser card 180 and connects connector 175 to connector 185. Trace 187', which exhibits an impedance (Z) of 60 ohms, is 8 mils wide (W) and 1000 mils long (L). Trace 187' is coupled to a pin of connector 185 which exhibits an impedance (Z) of approximately 80 ohms in this particular example. The impedance of connector 185 does not match that of the 60 ohm microstrip transmission line trace 187' and thus a second impedance discontinuity is encountered on the bus. Still referring to FIG. 2C, a trace 194' of microstrip transmission line (MLIN) is situated on expansion card 190 and connects connector 185 to a port 192A of chip or circuit 192. Trace 194', which exhibits an impedance (Z) of 60 ohms, is 8 mils wide (W) and 2500 mils long (L). Port 192A to which microstrip transmission line trace 194' terminates also exhibits an impedance (Z) of 60 ohms. The example just described follows a single trace from port 115A to port 192A. In actual practice, there are as many of such traces as needed to form the full complement of address, data and control lines of a particular bus.

In a vertically compact IHS such as that described above with a 1U height where the space for a riser card 180 is very limited, connectors 175 and 185 are very close together, namely approximately 1 inch apart. Under these conditions, connectors 175 and 185 tend to exhibit a higher impedance than the microstrip transmission line traces which connect thereto. Connectors 175 and 185 exhibit an impedance of approximately 80 ohms whereas the microstrip transmission line traces exhibit an impedance of approximately 60 ohms in this particular example. Since connectors 175 and 185 are so closely spaced, rather than merely causing the IHS to suffer the adverse effects of two separate mismatched connectors, the two connectors effectively appear as one very large merged impedance discontinuity to the surrounding bus structure. This problem is solved in the IHS shown in FIG. 3A–3C by using a lowered impedance interconnect to replace microstrip transmission line traces 187' of FIG. 2B to effectively lower and compensate for the high impedance of the large discontinuity to bring the overall aggregate impedance of the two connectors and the impedance interconnect closer to 60 ohms, or back to approximately 60 ohms, which is the impedance of bus 170.

Figure 3A:
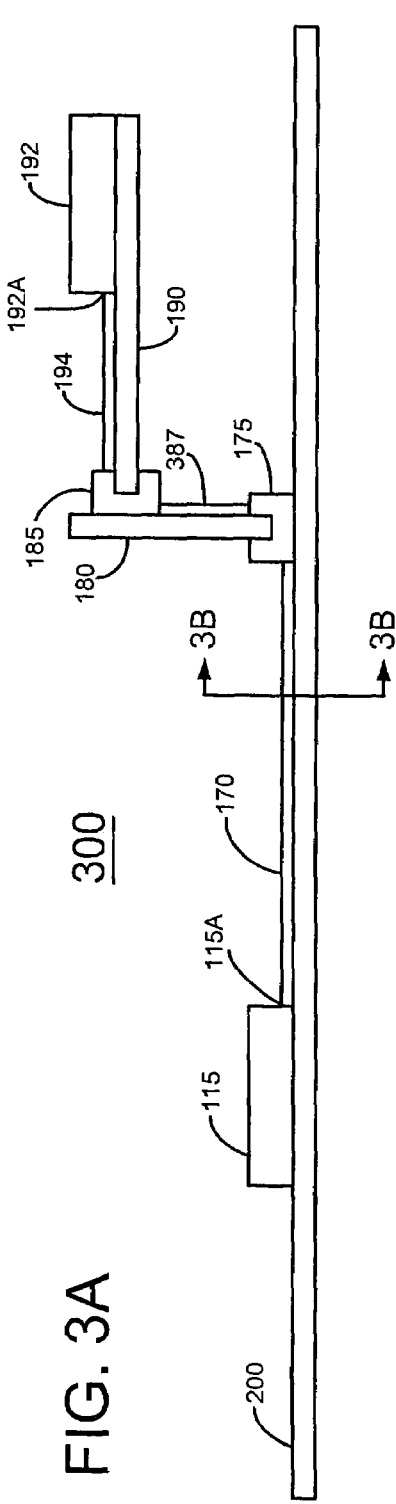
FIG. 3A–3C show the disclosed information handling system which employs a compensation technique to alleviate impedance discontinuities associated with closely spaced connectors along a bus of the system, according to an embodiment.
Figure 3C:
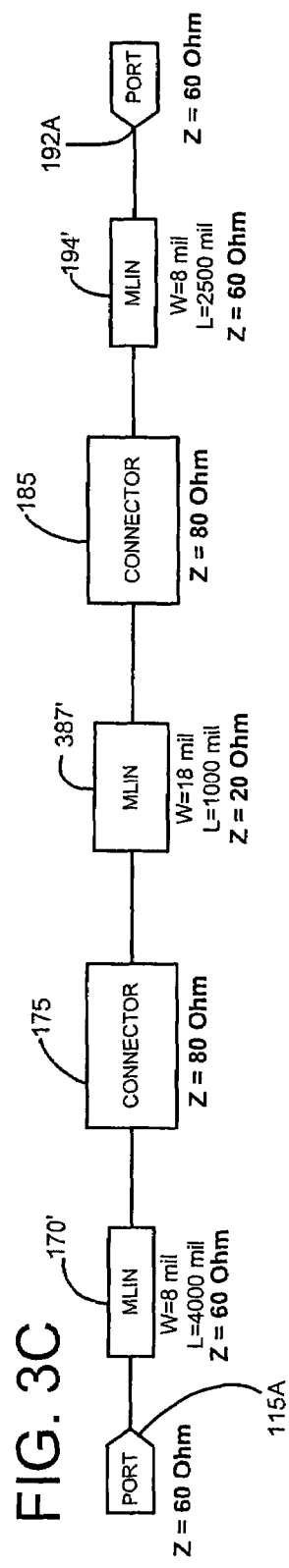
Figure 3B:
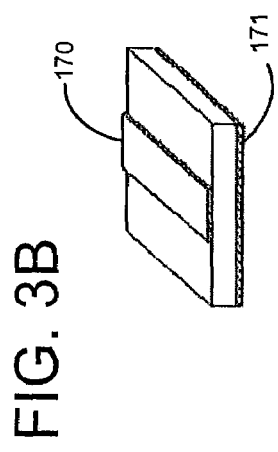

IHS 300 of FIG. 3A–3C is similar to the IHS of FIG. 2A–2C except for the low impedance interconnect 387 (alternatively referenced as low impedance interconnecting bus 387) which is employed instead of interconnecting bus 187. Like numbers are used to indicate like components in FIG. 3A–3C and FIG. 2A–2C. A representative trace 387' of the microstrip transmission line which forms low impedance interconnecting bus 387 is shown in FIG. 3C. It is noted that the dimensions of trace 387' are changed from the dimensions of 187' to substantially lower the impedance of the trace and thus lower the impedance of the interconnecting bus of which it forms a part. In this particular example, the width (W) of trace 387' is 18 mils which is noted to be substantially wider than the 8 mil width (W) of trace 187'. The increased width of trace 387' lowers the impedance of the trace to approximately 20 ohms which compensates and approximately balances out the impedance increase or discontinuity caused by connectors 175 and 185. For this reason, low impedance interconnect 387 smoothes out and compensates for the overall merged impedance discontinuity associated with connectors 175 and 185.

Figure 4:
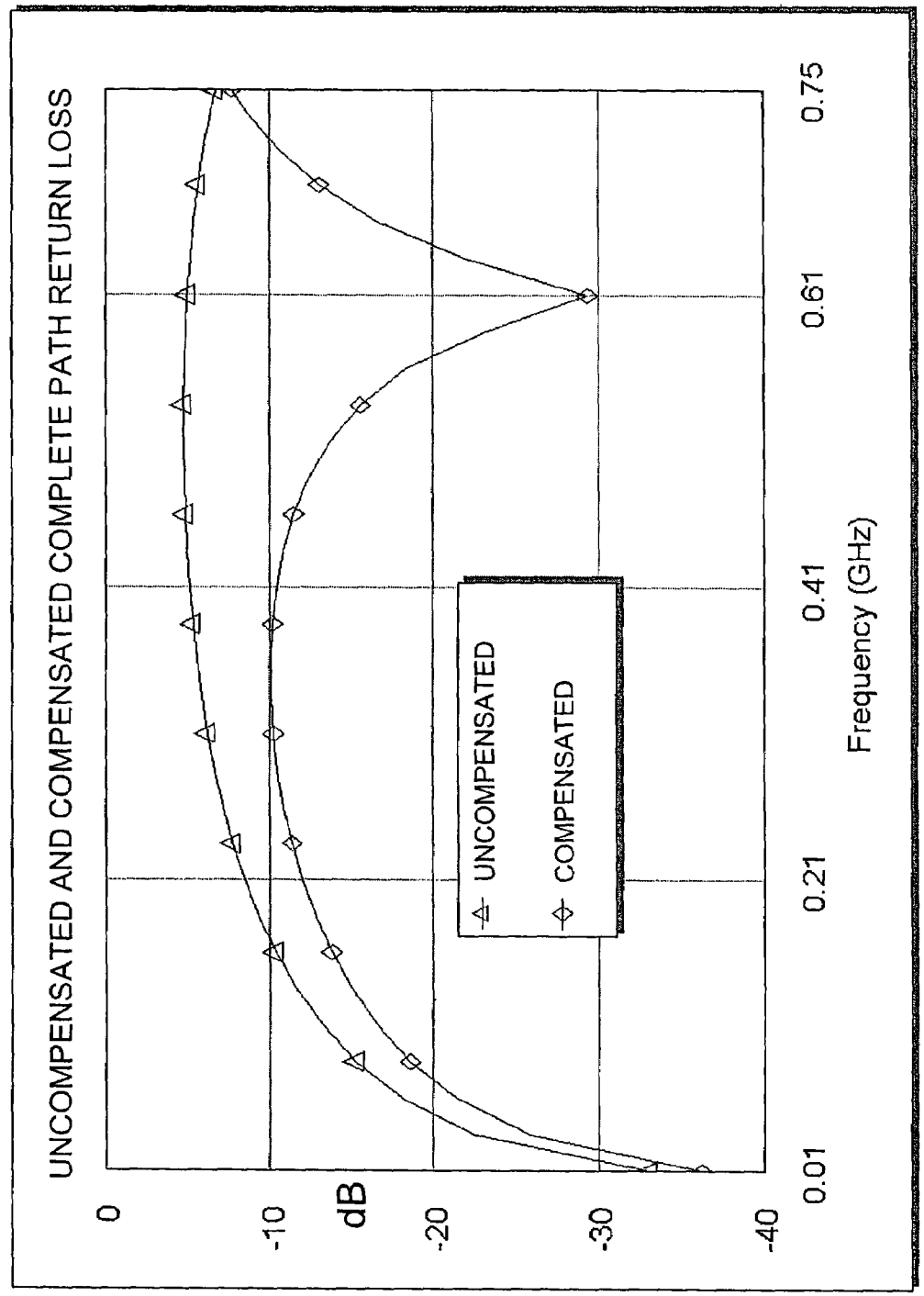
FIG. 4 is a graph of the uncompensated vs. the compensated complete return path loss showing the significant improvement achieved using the disclosed compensation technique, according to an embodiment.

FIG. 4 is a graph of complete path return loss (RL) from port 115A which may be regarded as the signal source to port 192A which may be regarded as the signal load or termination point. Frequency in GHz is plotted along the x axis and return loss in dB is plotted on the y axis. The uncompensated return loss associated with the IHS of FIG. 2A–2C is denoted by the curve marked with triangles. The compensated return loss associated with the IHS of FIG. 3A–3C is denoted by the curve marked with diamonds. Return loss represents the amount of reflection observed from an interconnect system. Lower return loss, such as shown in the compensated case indicated by the diamonds, is indicative of a more closely matched load and diminished discontinuities. In FIG. 4, it is seen that there is significant improvement in the compensated case indicated by the curve with diamonds since less incident signal is reflected back along the signal path from port 115A to port 192A.

Figure 5:
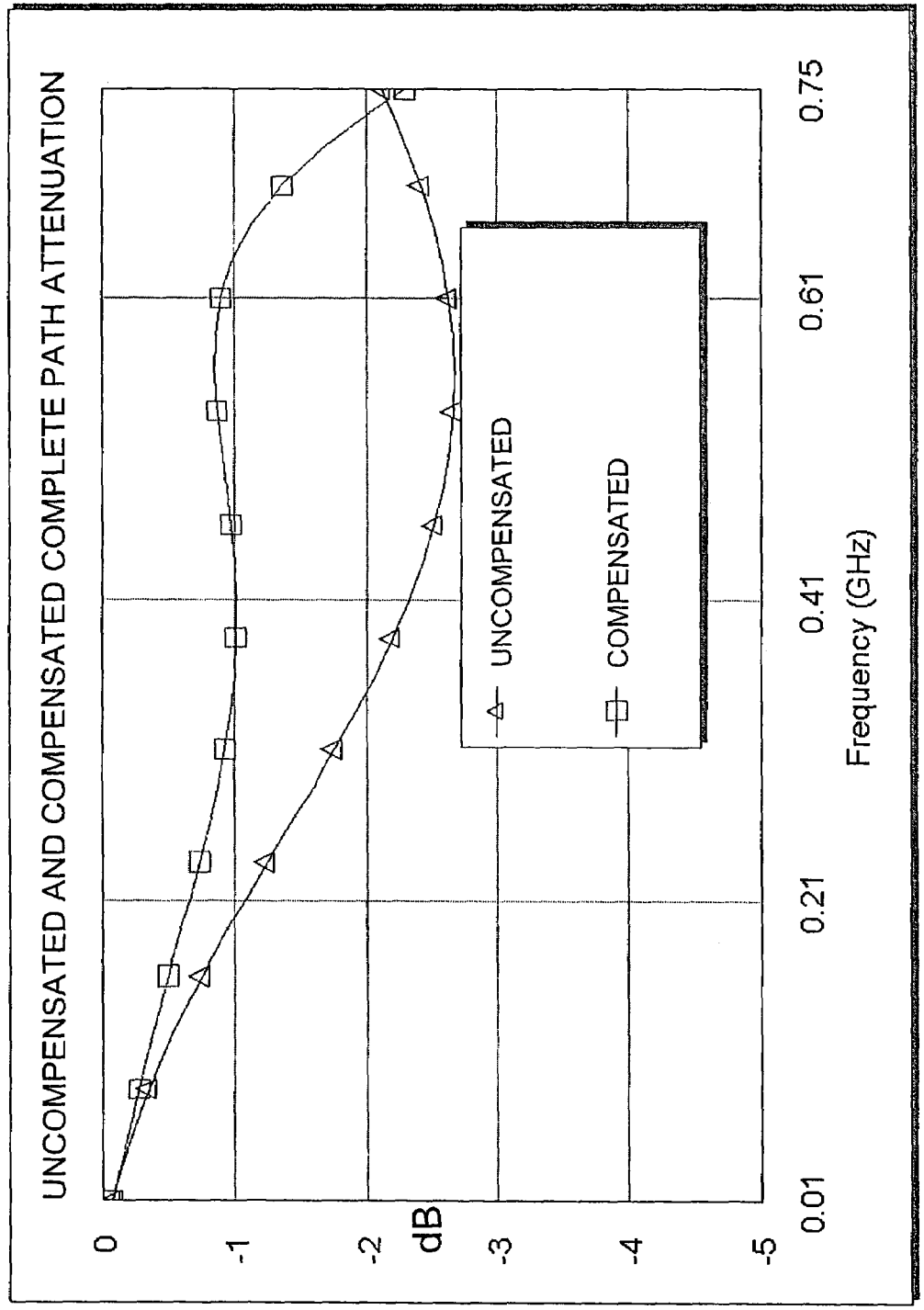
FIG. 5 is a graph of the uncompensated vs. the compensated complete path attenuation further demonstrating the significant improvement achieved using the disclosed compensation technique, according to an embodiment.

FIG. 5 is a graph which compares the compensated and uncompensated complete path attenuation of the signal path between port 115A and port 192A. Frequency is plotted in GHz along the x axis and complete path attenuation is plotted in dB along the y axis. Zero (O) dB of attenuation is indicated at the uppermost value of the y axis. The uncompensated path attenuation associated with the IHS of FIG. 2A–2C is denoted by the curve marked with triangles. The compensated path attenuation associated with the IHS of FIG. 3A–3C is denoted by the curve marked with squares. The closer the attenuation is to 0 dB, the more indicative this is of a less lossy path and a more closely matched impedance signal path. The graph of FIG. 5 shows that by using the disclosed low impedance interconnect between the two connectors, system performance is significantly improved. More of the incident signal from port 115A reaches the load circuit at port 192A across most of the frequency range illustrated.

Figure 6:
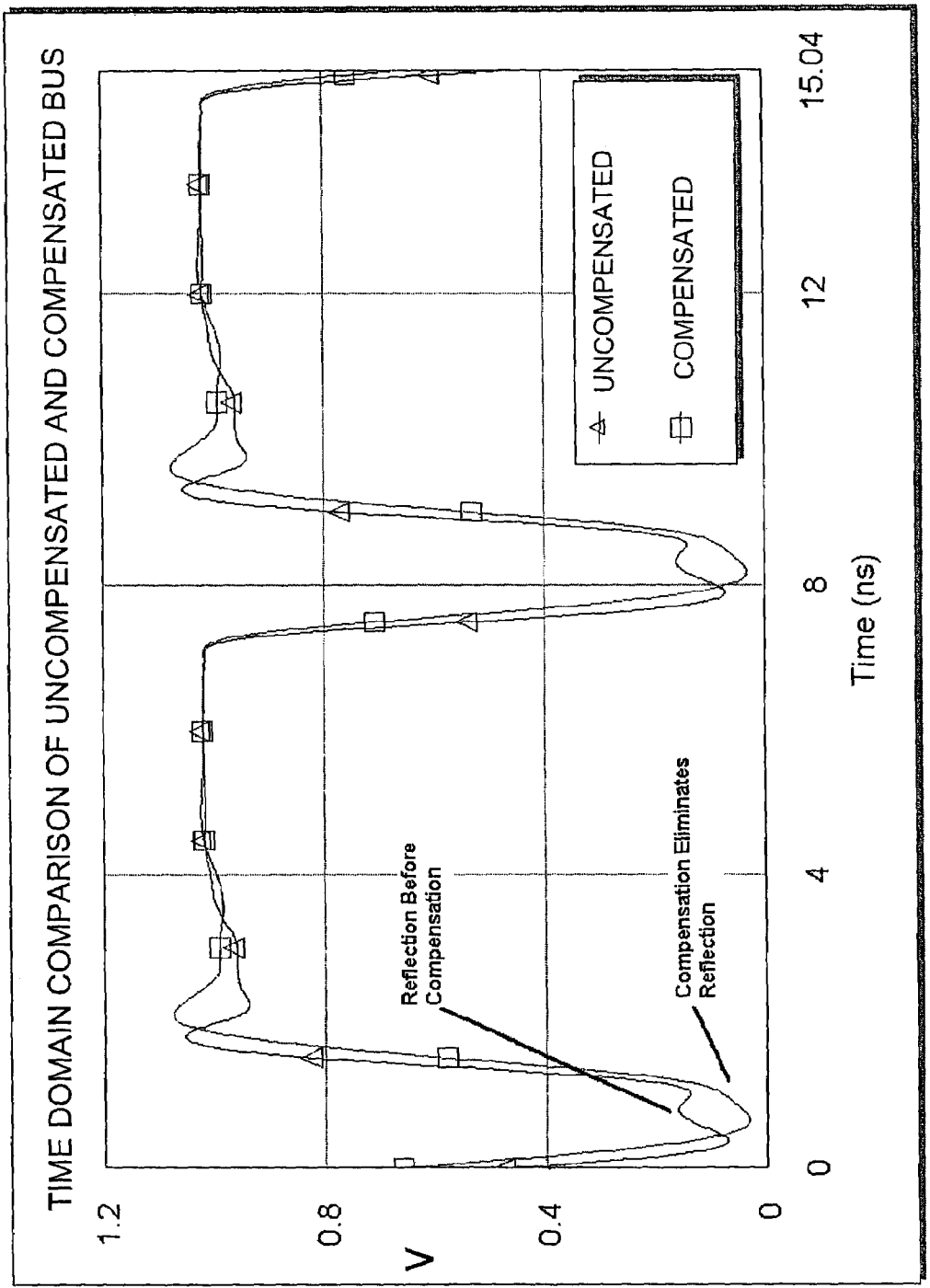
FIG. 6 is a graph comparing a digital signal in the time domain on the uncompensated bus of FIG. 2A–2C vs. the compensated bus of FIG. 3A–3C, according to an embodiment.

FIG. 6 is a graph comparing a digital signal in the time domain on the uncompensated vs. the compensated bus. The digital signal on the uncompensated bus of FIG. 2A–2C is denoted by triangles. The digital signal on the compensated bus of FIG. 3A–3C is denoted by squares. Time in nanoseconds (ns) is plotted along the x axis and voltage is plotted on the y axis. This time domain comparison of two ideal pulses passing through the uncompensated and compensated signal paths demonstrates suppression of a reflection in the compensated case. In FIG. 6, a reflection that occurs on the uncompensated path is marked "Reflection Before Compensation" and the suppression of that reflection is marked "Compensation Eliminates Reflection" so that the improvement will be appreciated.

Advantageously, the disclosed methodology and apparatus allow a low profile IHS to be fabricated with a riser card exhibiting a very small vertical dimension without suffering impedance mismatch effects caused by bus connectors being located very close to one another.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in manner consistent with the scope of the embodiments disclosed herein.

What is claimed is:

1. A method of controlling the impedance of a bus in an information handling system (IHS), the method comprising:
   providing a first bus coupled to a first connector, the first bus exhibiting a bus impedance, the first connector exhibiting a connector impedance which is greater than the bus impedance; and
   providing a riser card in the first connector, the riser card including a second connector and an interconnect between the first and second connectors, the second connector exhibiting an impedance approximately equal to the connector impedance of the first connector, the interconnect exhibiting an impedance sufficiently low to compensate the amount by which the connector impedance exceeds the bus impedance.

2. The method of claim 1 including providing an expansion card situated in the second connector of the riser card.

3. The method of claim 2 wherein the expansion card includes a second bus exhibiting an impedance approximately equal to the bus impedance.

4. The method of claim 1 wherein the first bus is a microstrip transmission line bus.

5. The method of claim 1 wherein the impedance interconnect is a microstrip transmission line bus.

6. The method of claim 1 wherein the first bus includes a plurality of traces exhibiting a first width and the interconnect includes a plurality of traces exhibiting a width greater than the width of the traces of the first bus.

7. The method of claim 1 wherein the first bus is a PCI bus on a motherboard.

8. The method of claim 2 wherein the first bus is a PCI-X bus on a motherboard.

9. The method of claim 1 wherein the first and second connectors are closely spaced within a 1U dimension.

10. The method of claim 7 wherein the riser card is oriented substantially perpendicular with the board on which the first bus is situated.

11. The method of claim 8 wherein the riser card is oriented substantially perpendicular with the board on which the first bus is situated and the expansion card is situated substantially parallel with the board on which the first bus is situated.

12. An information handling system (IHS) comprising:
    a processor;
    a port coupled to the processor;
    a first connector coupled to the port by a first bus therebetween, the first bus exhibiting a bus impedance, the first connector exhibiting a connector impedance greater than the bus impedance; and
    a riser card situated in the first connector, the riser card including a second connector and an interconnect between the second connector and the first connector, the second connector exhibiting a connector impedance approximately equal to the connector impedance of the first connector, the impedance of the interconnect being sufficiently low to compensate the amount by which the connector impedance exceeds the bus impedance.

13. The IHS of claim 12 including an expansion card situated in the second connector of the riser card, the expansion card including a second bus exhibiting a bus impedance approximately equal to the impedance of the first bus, the impedance of the interconnect being sufficiently low that the aggregate impedance of the first connector, the interconnect and the second connector is approximately the same as the first impedance.

14. The IHS of claim 12 wherein the first bus is a microstrip transmission line bus.

15. The IHS of claim 12 wherein the interconnect is a microstrip transmission line bus.

16. The IHS of claim 12 wherein the first bus includes a plurality of traces exhibiting a first width and the interconnect includes a plurality of traces exhibiting a width greater than the first width.

17. The IHS of claim 12 wherein the first bus is a PCI bus on a motherboard.

18. The IHS of claim 13 wherein the first bus is a PCI-X bus on a motherboard.

19. The IHS of claim 12 wherein the first and second connectors are closely spaced within a 1U dimension.

20. The IHS of claim 17 wherein the riser card is oriented substantially perpendicular with the motherboard on which the first bus is situated.

21. The IHS of claim 18 wherein the riser card is oriented substantially perpendicular with the motherboard on which the first bus is situated and the expansion card is situated substantially parallel with the motherboard on which the first bus is situated.

22. An information handling system comprising:
    a chassis;
    a processor mounted in the chassis;
    a port coupled to the processor;
    a first connector coupled to the port by a first bus therebetween, the first bus exhibiting a bus impedance, the first connector exhibiting a connector impedance greater than the bus impedance; and
    a riser card situated in the first connector, the riser card including a second connector and an interconnect between the second connector and the first connector, the second connector exhibiting a connector impedance approximately equal to the connector impedance of the first connector, the impedance of the interconnect being sufficiently low to compensate the amount by which the connector impedance exceeds the bus impedance.

* * * * *